(12) United States Patent
Hsieh

(10) Patent No.: US 10,455,852 B2
(45) Date of Patent: Oct. 29, 2019

(54) RAPID DEFROSTING TRAY

(71) Applicant: Meng-Hsiu Hsieh, Taichung (TW)

(72) Inventor: Meng-Hsiu Hsieh, Taichung (TW)

(*) Notice: Subject to any disclaimer, the term of this patent is extended or adjusted under 35 U.S.C. 154(b) by 272 days.

(21) Appl. No.: 15/097,761

(22) Filed: Apr. 13, 2016

(65) Prior Publication Data

US 2017/0295831 A1 Oct. 19, 2017

(51) Int. Cl.
*A23L 3/365* (2006.01)
*A47J 36/24* (2006.01)

(52) U.S. Cl.
CPC ............... *A23L 3/365* (2013.01); *A47J 36/24* (2013.01)

(58) Field of Classification Search
CPC .................................. A47J 36/24; A23L 3/365
USPC ........................................................... 99/483
See application file for complete search history.

(56) References Cited

U.S. PATENT DOCUMENTS

| | | | | |
|---|---|---|---|---|
| 2002/0164522 A1* | 11/2002 | Huang | ................ | H01M 8/0215 429/478 |
| 2005/0129928 A1* | 6/2005 | Lee | ....................... | B82Y 30/00 428/323 |
| 2010/0025253 A1* | 2/2010 | Yoshioka | ............... | C25D 11/06 205/50 |
| 2011/0146640 A1* | 6/2011 | Achstaetter | ............. | H01T 13/36 123/608 |
| 2016/0082704 A1* | 3/2016 | Wu | ........................ | B32B 17/06 428/428 |

FOREIGN PATENT DOCUMENTS

| | | | | | |
|---|---|---|---|---|---|
| EP | 0179527 A1 | * | 4/1986 | .......... | B21C 37/042 |
| JP | 55043747 A | * | 3/1980 | | |
| JP | 63069183 A | * | 3/1988 | ............... | H05B 3/20 |

* cited by examiner

*Primary Examiner* — Dana Ross
*Assistant Examiner* — Kuangyue Chen
(74) *Attorney, Agent, or Firm* — Muncy, Geissler, Olds & Lowe, P.C.

(57) ABSTRACT

A defrosting tray includes a metal substrate, a thermal conductive ceramic coating formed on the top surface of the metal substrate, and an inorganic nanocoating formed on a top surface of the thermal conductive ceramic coating. The thermal conductive ceramic coating is configured to enhance a heat transfer capability of the metal substrate. In particular, the first ceramic coating and the first inorganic nanocoating together define a defrosting surface with sub-micron pyramidal arrays.

6 Claims, 3 Drawing Sheets

RAPID DEFROSTING TRAY

BACKGROUND OF THE INVENTION

1. Field of the Invention

The present invention relates to a rapid defrosting tray for frozen foods, and more particularly to a rapid defrosting tray that requires no electrical energy consumption.

2. Description of the Related Art

Defrosting operation is typically carried out by leaving the frozen food in the refrigerator for 24 hours or less in order to more gradually enable it to thaw evenly. This method is generally recommended as it keeps the food at a temperature at which bacteria do not thrive. Another method is to leave the frozen food on a countertop at room temperature for an extended period of time during which time the ambient heat energy is transferred from the room air at its temperature and humidity, directly into the frozen food. However, the amount of time required to thaw may be unacceptably long, and part of the frozen food often warms over time, allowing bacteria to multiply quickly and creating a health hazard.

It would be beneficial to have an apparatus for thawing frozen food items that works relatively quickly, and in a way that reduces health risks. Most rapid food-thawing devices of the prior art, however, are energy-consuming devices. They typically draw electrical current through resistive heating elements to generate the heat required for thawing.

What is needed, then, is an environmentally-friendly device that performs the function of food thawing in a relatively short amount of time and in the absence of electrical energy consumption.

SUMMARY OF THE INVENTION

Accordingly, it is an object of the present invention to provide a defrosting tray to satisfy the aforementioned need.

Briefly described, the defrosting tray of this invention includes a metal substrate, a thermal conductive ceramic coating formed on a top surface of the metal substrate, and an inorganic nanocoating formed on a top surface of the thermal conductive ceramic coating. The metal substrate is preferably made of aluminum alloy. The thermal conductive ceramic coating is configured to enhance a heat transfer capability of the metal substrate. In particular, the thermal conductive ceramic coating and the inorganic nanocoating together define a defrosting surface with sub-micron pyramidal arrays.

Preferred embodiments of the invention may have the following additional characteristics, either alone or in combination:

The inorganic nanocoating comprises a material selected from the group consisting of Silicon dioxide and Titanium dioxide.

The first thermal conductive ceramic coating comprises an inorganic resin doped with inorganic heat-conductive powder.

The inorganic resin of the first thermal conductive ceramic coating is made by a sol-gel process.

The inorganic heat conductive powder of the first thermal conductive ceramic coating comprises Silicon carbide.

The first thermal conductive ceramic coating has a thickness in the range of about 30 to 60 μm.

The foregoing and other objectives, features, and advantages of the invention will be more readily understood upon consideration of the following detailed description of the invention, taken in conjunction with the accompanying drawings.

DETAILED DESCRIPTION OF EMBODIMENTS

Figure 1:
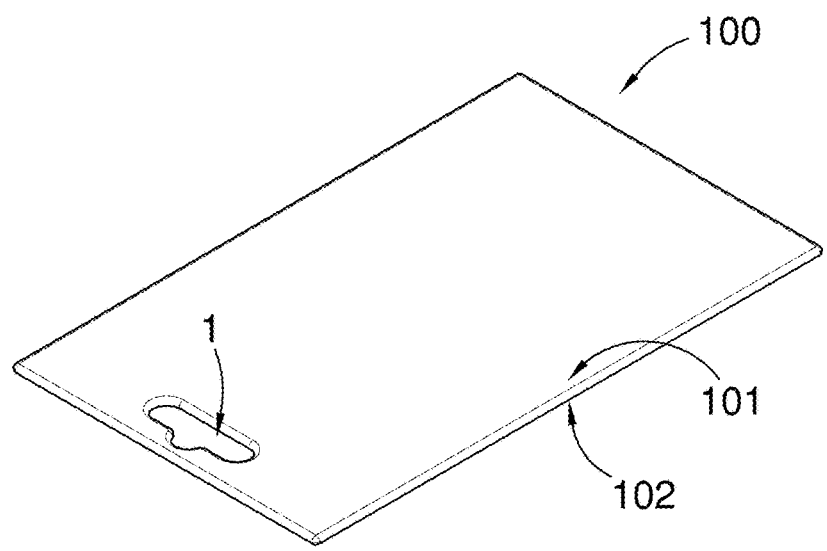
FIG. 1 is a front perspective view of a defrosting tray in accordance with one embodiment of the present invention.
Figure 2:
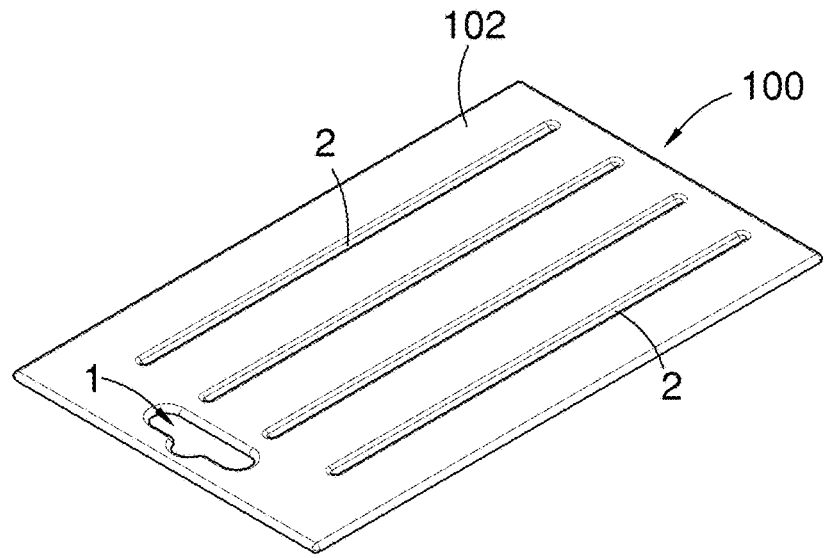
FIG. 2 is a rear perspective view of the defrosting tray in FIG. 1.
Figure 3:
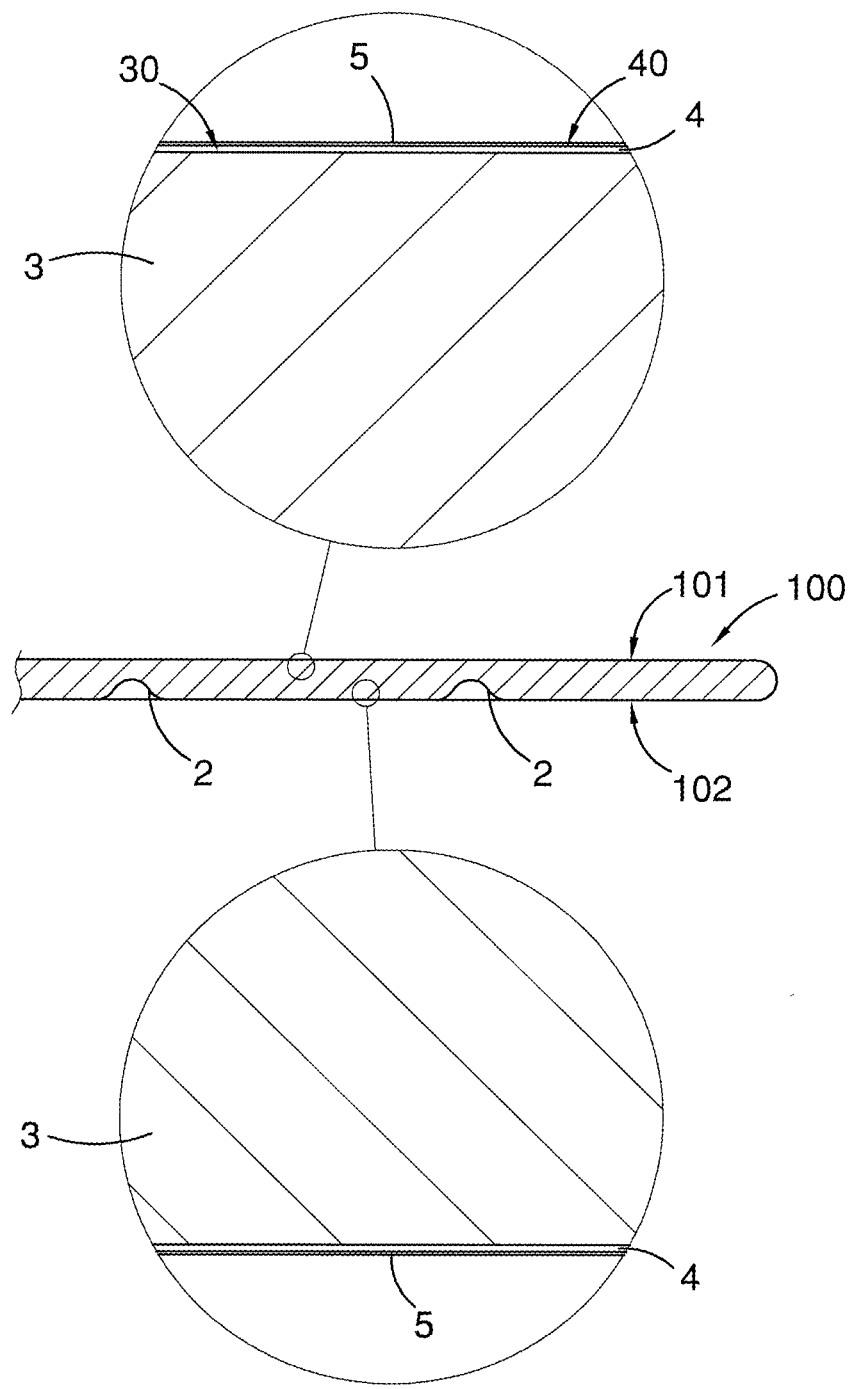
FIG. 3 is a partially cross-sectional view of the defrosting tray shown in FIG. 1 with two partially enlarged cross-sectional views of the defrosting tray.

Referring to FIGS. 1 and 2, there is shown a preferred embodiment of the defrosting tray 100. At a macroscopic level, the defrosting tray 100 has a hang hole 1 to allow the tray 100 to be placed on a hook, when not in use. The defrosting tray 100 has a flat top surface 101 as shown in FIG. 1, and a bottom surface 102 in which a plurality of grooves 2 are defined, as can be seen in FIG. 2. FIG. 3 is a partially cross-sectional view of the defrosting tray 100 shown in FIG. 1. FIG. 3 is a partially enlarged cross-sectional view of the defrosting tray shown in FIG. 3.

Referring to FIG. 3, the defrosting tray 100 includes a metal substrate 3, a thermal conductive ceramic coating 4 coated around the periphery of the metal substrate 3, and an inorganic nanocoating 5 coated around the periphery of the thermal conductive ceramic coating 4. In other words, the metal substrate 3 is a core layer of the defrosting tray 100; the inorganic nanocoating 5 is the outermost layer of the defrosting tray 100; and the thermal conductive ceramic coating 4 is a middle layer in between the metal substrate 3 and the inorganic nanocoating 5. The inorganic nanocoating 5 has a thickness that is so small that it is not shown in FIG. 3. Moreover, the metal substrate 3 defines in its bottom surface a plurality of concaves (not numbered) from which the grooves 2 of the defrosting tray 100 are formed.

For simplification purpose, the following description will be made only to the upper part of the defrosting tray 100. As stated, it is to be understood the structure of the lower part are identical. Referring to FIG. 3, the metal substrate 3 is preferably made of alloy with high heat conductivity, such as aluminum alloy. The thermal conductive ceramic coating 4 is formed on the top surface 30 of the metal substrate 3, by spray coating methods, to assist heat absorption and/or heat dissipation of the metal substrate 3, and thereby to enhance the heat transfer capability of the metal substrate 3. Likewise, the inorganic nanocoating 5 is formed on the top surface 40 of the thermal conductive ceramic coating 4 by spray coating methods. The inorganic nanocoating 5 comprises a material selected from the group consisting of Silicon dioxide and Titanium dioxide, which has the characteristics such as anti-oxidation, anti-corrosion and abrasion resistance to provide at least basic protection for the defrosting tray 100.

To promote heat transfer, the thermal conductive ceramic coating 4 is substantially made of an inorganic resin doped with inorganic heat-conductive powder. In this embodiment, the inorganic resin of the thermal conductive ceramic coating 4 is made by a sol-gel process. The sol-gel process is a wet-chemical technique used for the fabrication of both glassy and ceramic materials. In this process, the sol (or solution) evolves gradually towards the formation of a gel-like network containing both a liquid phase and a solid phase. Typical precursors are metal alkoxides and metal chlorides, which undergo hydrolysis and polycondensation reactions to form a colloid. If the liquid in a wet gel is removed under a supercritical condition, a highly porous material with high surface area is obtained. The basic structure or morphology of the solid phase can range anywhere from discrete colloidal particles to continuous chain-like polymer networks. It is during the sol-gel process of the inorganic resin that the inorganic heat conductive powder is added into the inorganic resin to form the thermal conductive ceramic coating 4. Preferably, the inorganic heat conductive powder of the thermal conductive ceramic coating 4 comprises silicon carbide (SiC) to increase the heat conductivity of the thermal conductive ceramic coating 4 and further to provide antibacterial properties.

Referring to FIG. 3, the metal substrate 3 has a thickness of about 6 mm. The thermal conductive ceramic coating 4 has a thickness in the range of about 30 µm to 60 µm, preferably of about 40 µm to 50 µm. However, the thickness of the inorganic nanocoating 5 is too small to be measured. Even though the thermal conductive ceramic coating 4 and the inorganic nanocoating 5 together are extremely thin, they have excellent durability, rigidity and high thermal stability performance.

Figure 4:
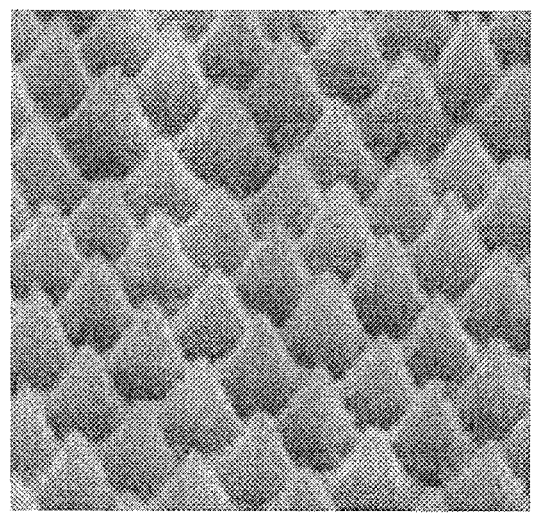
FIG. 4 depicts, in a mesoscopic level, a sub-micron pyramidal array of a surface of the defrosting tray.

In particular, in a mesoscopic level, the thermal conductive ceramic coating 4 and the inorganic nanocoating 5 together define a defrosting surface with sub-micron pyramidal arrays, as depicted in FIG. 4. With the pyramidal arrays, water released by the melting of the frozen food can hardly stay on the defrosting surface of the tray 100 but slip away, and the environment air can easily enter the gaps among the frozen food and the sub-micron pyramidal arrays of the defrosting tray 100, and therefore quickly transfer heat energy into the frozen food to be defrosted. Most particularly, even if the environment temperature drops down to below zero degrees (0° C.), the defrosting tray 100 can still function well as long as there is a temperature difference between the frozen food and the ambient environment, where the heat transfer process, i.e., the thawing process, can continue.

As described above, the defrosting tray of the present invention is an environmentally-friendly device that performs the function of food thawing in the absence of electrical energy consumption and in a relatively short amount of time.

It should be evident that this disclosure is by way of example and that various changes may be made by adding, modifying or eliminating details without departing from the fair scope of the teaching contained in this disclosure.

What is claimed is:

1. A defrosting tray comprising a flat board consisting of a thermal conductive metal substrate, a thermal conductive ceramic coating and a relatively thin inorganic coating, wherein the thermal conductive metal substrate is a core layer of the flat board, the relatively thin inorganic coating is the outermost layer of the flat board, and the thermal conductive ceramic coating is a middle layer between the thermal conductive metal substrate and the inorganic coating, wherein the thermal conductive ceramic coating is coated around a periphery of the thermal conductive metal substrate, and made of an inorganic resin doped with inorganic heat-conductive powder, wherein the relatively thin inorganic coating is coated around a periphery of the thermal conductive ceramic coating, wherein the relatively thin inorganic coating comprises a material selected from the group consisting of Silicon dioxide and Titanium dioxide.

2. The defrosting tray as recited in claim 1, wherein the metal substrate defines a plurality of grooves in a bottom surface thereof.

3. The defrosting tray as recited in claim 1, wherein the metal substrate comprises aluminum alloy.

4. The defrosting tray as recited in claim 1, wherein the inorganic resin of the thermal conductive ceramic coating is made by a sol-gel process.

5. The defrosting tray as recited in claim 1, wherein the inorganic heat conductive powder of the thermal conductive ceramic coating comprises Silicon carbide.

6. The defrosting tray as recited in claim 5, wherein the thermal conductive ceramic coating has a thickness in the range of 30 µm to 60 µm.

* * * * *